(12) United States Patent  
Heo et al.

(10) Patent No.: US 9,106,568 B2  
(45) Date of Patent: Aug. 11, 2015

(54) METHOD OF DETERMINING ROUTING PATH BASED ON CHANGE IN DYNAMIC STATE OF NODES

(75) Inventors: Joon Heo, Daejeon (KR); Jung Im Kang, Daejeon (KR); Jung Yeon Lee, Daejeon (KR)

(73) Assignee: INSTITUTE FOR BASIC SCIENCE, Daejeon (KR)

( * ) Notice: Subject to any disclaimer, the term of this patent is extended or adjusted under 35 U.S.C. 154(b) by 0 days.

(21) Appl. No.: 13/515,489

(22) PCT Filed: Nov. 11, 2011

(86) PCT No.: PCT/KR2011/008598  
§ 371 (c)(1),  
(2), (4) Date: Jun. 12, 2012

(87) PCT Pub. No.: WO2013/069837  
PCT Pub. Date: May 16, 2013

(65) Prior Publication Data  
US 2014/0233561 A1  Aug. 21, 2014

(30) Foreign Application Priority Data  
Nov. 10, 2011  (KR) .................. 10-2011-0117101

(51) Int. Cl.  
*H04L 12/28* (2006.01)  
*H04L 12/707* (2013.01)  
*H04L 12/721* (2013.01)  
*H04L 12/727* (2013.01)  
*H04L 12/715* (2013.01)  
*H04L 12/751* (2013.01)

(52) U.S. Cl.  
CPC .............. *H04L 45/24* (2013.01); *H04L 45/121* (2013.01); *H04L 45/123* (2013.01); *H04L 45/22* (2013.01); *H04L 45/70* (2013.01); *H04L 45/02* (2013.01); *H04L 45/64* (2013.01)

(58) Field of Classification Search  
USPC .............. 370/238, 238.1, 230.1, 231, 395.31, 370/395.21, 400, 422, 428, 392  
See application file for complete search history.

(56) References Cited

U.S. PATENT DOCUMENTS

2005/0265258 A1\* 12/2005 Kodialam et al. ............. 370/254  
2006/0221866 A1\* 10/2006 Shepherd ...................... 370/255

\* cited by examiner

*Primary Examiner* — Zewdu A Beyen  
(74) *Attorney, Agent, or Firm* — Lowe Hauptman & Ham, LLP

(57) ABSTRACT

The present invention relates to a method of determining a routing path in a communication network in which a plurality of logical networks shares a physical network, and more particularly to such a method of determining a routing path of data, in which multiple routing paths from a source node to a destination node are created based on a change in the dynamic state of a plurality of nodes constituting a logical network, and routing costs for the created multiple routing paths are calculated based on a routing registration message received from the plurality of nodes, and a process time transition value and a transmission time transition value shared by the plurality of nodes.

5 Claims, 7 Drawing Sheets

| ID | Head Info | P | T | | A$_{max}$ | E$_A$ |
|---|---|---|---|---|---|---|
| 0010 | Y/Z | 0.1 | T$^{XY}$(0.1) | T$^{XZ}$(0.2) | 4 | 2 |

| Multiple routing paths | Routing costs |
|---|---|
| Routing path A1 :{(S,w0), (w0,x0), (x0,z0), (z0,D)} | 0.38 |
| Routing path A2 :{(S,w0), (w0,x0), (x0,z1), (z1,D)} | 0.40 |
| Routing path A3 :{(S,w0), (w0,x1), (x1,z0), (z0,D)} | 0.43 |
| Routing path A4 :{(S,w0), (w0,x1), (x1,z1), (z1,D)} | 0.45 |
| Routing path A5 :{(S,w0), (w0,x1), (x1,z0), (z0,D)} | 0.5 |
| ... | |
| Routing path B1 :{(S,y0), (y0,x0), (x0,z0), (z0,D)} | 0.40 |
| Routing path B2 :{(S,y0), (y0,x0), (x0,z1), (z1,D)} | 0.43 |
| Routing path B3 :{(S,y0), (y0,x1), (x1,z0), (z0,D)} | 0.45 |
| ... | |

| ID | $C_A$ | $E_A$ |
|----|-------|-------|
| X  | $X_1$ | 3     |

METHOD OF DETERMINING ROUTING PATH BASED ON CHANGE IN DYNAMIC STATE OF NODES

CROSS REFERENCE TO RELATED APPLICATION

This application claims the priority of Korean Patent Application No. 10-2011-0117101, filed on Nov. 10, 2011 in the KIPO (Korean Intellectual Property Office). Further, this application is the National Phase application of International Application No. PCT/KR2011/008598 filed Nov. 11, 2011, which designates the United States and was filed in Korean.

BACKGROUND OF THE INVENTION

1. Field of the Invention

The present invention relates to a method of determining a routing path in a communication network in which a plurality of logical networks selectively shares a physical network, and more particularly to such a method of determining a routing path of data, in which multiple routing paths from a source node to a destination node are created based on a change in the dynamic state of a plurality of nodes constituting a logical network, and routing costs for the created multiple routing paths are calculated based on a routing registration message received from the plurality of nodes, and a process time transition value and a transmission time transition value shared by the plurality of nodes.

2. Background of the Related Art

Recently, the amount of Information technology (IT) cost and the scale of an information system are increasing exponentially across the world along with an increase in the demand for an information system. An increase in the cost for the information system triggers an interest in efficiency of the IT investment, and thus there is a need for a variety of technologies to solve this.

Among them, one is a network virtualization technology. Many related researches are in progress with a solution for accepting a multi-network structure in a single infrastructure, starting from the concept that a plurality of networks logically separated from one another can coexist based on a shared network system. A network infrastructure is divided into a plurality of logical networks and is defined in order to efficiently utilize a limited communication network resource using the network virtualization technology or ensure the quality for a specific communication network-based service.

Figure 1:
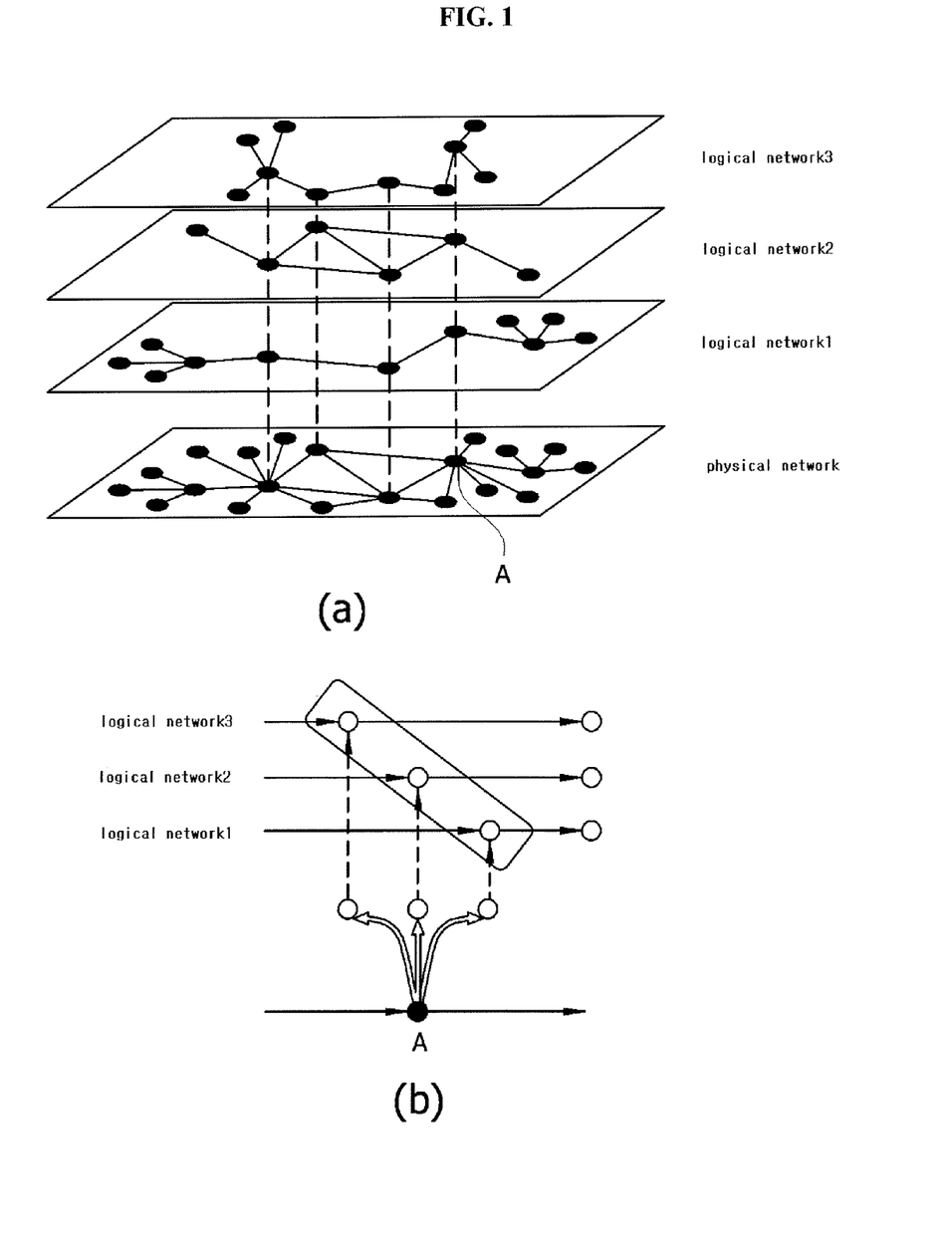
FIG. 1 illustrates an example in which a network infrastructure is constructed so as to be shared by a plurality of logical networks based on a network virtualization technology.

FIG. 1 illustrates an example in which a network infrastructure is constructed so as to be shared by a plurality of logical networks based on a network virtualization technology.

Referring to FIG. 1(a), the plurality of logical networks shares a network infrastructure, i.e., a physical network. For example, logical networks 1 to 3 are constructed to share some of nodes constituting the physical network. A logical network 1 shares some nodes to be used together with a logical network 2 or a logical network 3. The data process and data transmission capabilities of the nodes shared by the plurality of logical networks are dynamically changed depending on the number of shared logical networks, the degree of function that each logical network can perform, and the like.

Referring to FIG. 1(b), logical networks 1 to 3 are constructed to share a node A of a physical network with each other. If the transmission of large-capacity data increases in the logical networks 1 to 3, the data process or data transmission capability of the node A are dynamically changed depending on the number of shared logical networks, the kind of services, or the kind of data transmitted and received in the logical networks.

In an example of a method for determining a routing path in a conventional communication network, a source node receives information on the state of each node from each of nodes positioned on a routing path, and calculates routing costs for the routing paths from the source node to a destination node based on the received state information, thereby forwarding data through a routing path with the lowest routing cost.

However, the conventional routing path determining method entails a problem in that the routing path is determined from a routing path employing a one-dimensional graph structure considering only a connection state of the nodes, resulting in failure in reflecting a change in the dynamic state of nodes shared by the plurality of logical networks. In addition, such a conventional routing path determining method involves a drawback in that each time when a routing path is determined in each of the plurality of logical networks, each node of the logical network is required to transmit various items of routing information, including data process time, data transmission time, logical network identifier, and the like, to a source node, and thus such a method is undesirable in terms of efficient use of a limited resource, and much time is spent to determine the routing path.

SUMMARY OF THE INVENTION

Accordingly, the present invention has been made to solve the above-mentioned problems involved in the conventional routing path determining method, and it is an object of the present invention to provide a method for determining a routing path with a minimum cost by defining a conventional routing path employing a one-dimensional graph structure based on the concept of a multi-dimensional graph structure considering a change in the dynamic state of nodes.

Another object of the present invention is to provide a method for determining a routing path in which multiple routing paths are created depending on the dynamic change of the data process time and data transmission time of nodes shared by a plurality of logical networks, and a routing path with a minimum cost is determined among the created multiple routing paths.

Still another object of the present invention is to provide a method for determining a routing path in which the routing costs for multiple routing paths can easily calculated with a small amount of data based on a routing registration message, and a process time transition value and a transmission time transition value shared by nodes.

Yet another object of the present invention is to provide a method for determining a routing path in which multiple routing paths are created only based on a transition state of nodes until the present time using estimated state transition information of a routing registration message, and the created multiple routing paths can be easily extended based on the estimated state transition change information of a registration update message if the state of a node is different from estimated state transition information using the estimated state transition change information.

To achieve the above objects, the present invention provides a method for determining a routing path in a communication network consisting of a plurality of nodes, the method including: allowing a source node to receive a routing registration message from the remaining nodes except the source node among the plurality of nodes; allowing the source node to create multiple routing paths from the source node to a destination node of the nodes based on a change in the dynamic state of the nodes using the received routing registration message; allowing the source node to calculate routing costs for the created multiple routing paths based on the received routing registration message, and a process time transition value and a transmission time transition value shared by the nodes; creating a routing table having stored therein the calculated routing costs for the multiple routing paths; and allowing the source node to determine a routing path with the lowest routing cost among the multiple routing paths as a data routing path based on the routing costs stored in the routing table, wherein the routing registration message includes node connection state information, optimum data process time, optimum data transmission time, maximum state transition information, and estimated state transition information until the present time.

In the routing path determining method according to the present invention, the source node periodically may receive the registration update message including current state information and estimated state transition change information, which are measured in the nodes, from the nodes and the source node may determine a routing path with the lowest routing cost among the multiple routing paths as a data routing path based on the current state information of the registration update message and the routing costs for the multiple routing paths stored in the routing table.

Preferably, the source node may receive a routing registration message or a registration update message from nodes constituting a logical network.

In the routing path determining method according to an embodiment of the present invention, the step of allowing the source node to create the multiple routing paths may further include the steps of: determining a single routing path from the source node to the destination node based on the node connection state information of the routing registration message; and creating multiple routing paths from source node to the destination node based on a change in the dynamic state of an estimated state transition range of node constituting the single routing path using the estimated state transition information of the nodes constituting the single routing path. Herein, the source node may re-create the multiple routing paths from source node to the destination node based on a change in the dynamic state of an estimated state transition range changed when estimated state transition information of the node is changed based on the estimated state transition change information of the registration update message, calculate the routing costs for the re-created multiple routing paths, and update the routing table.

In the routing path determining method according to another embodiment of the present invention, the step of allowing the source node to create the multiple routing paths may further include the steps of: determining a single routing path from the source node to the destination node based on the node connection state information of the routing registration message; and creating multiple routing paths from source node to the destination node based on a change in the dynamic state of a maximum state transition range of node constituting the single routing path using the maximum state transition information of the nodes constituting the single routing path.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Now, a method for determining a routing path according to the preferred embodiment of the present invention will be described hereinafter in more detail with reference to the accompanying drawings.

Figure 2:
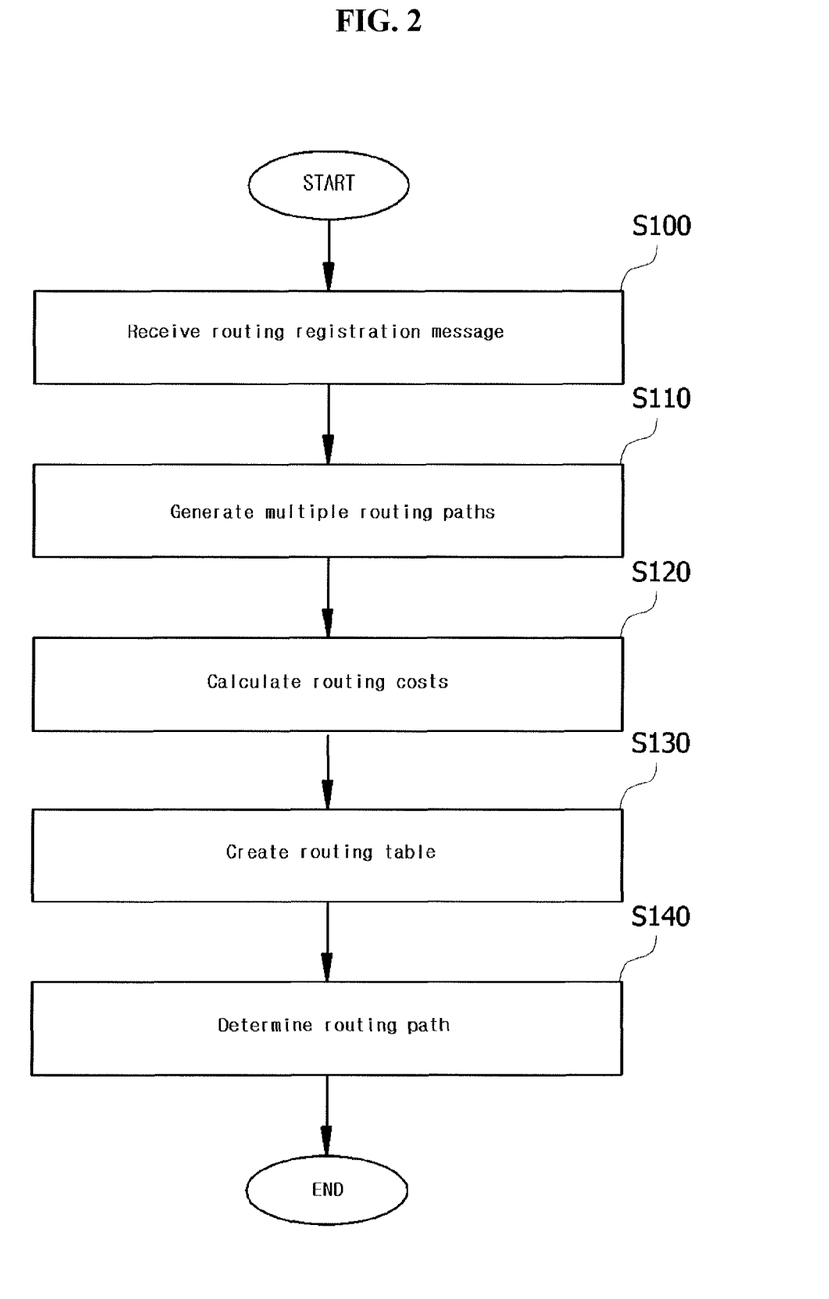
FIG. 2 is a flowchart for explaining a method for determining a routing path according an embodiment of the present invention.

FIG. 2 is a flowchart for explaining a method for determining a routing path according an embodiment of the present invention.

More specifically, referring to FIG. 2, a source node in a communication network receives a routing registration message from a plurality of nodes except the source node (S100). Infrastructures, i.e., nodes of the communication network are shared by a plurality of logical networks, and a source node in each logical network receives a routing registration message from the plurality of nodes constituting the logical network. Herein, the source node is a concept including a node of generating data to be transmitted to a destination node as well as an intermediate node of determining a routing path.

The source node creates multiple routing paths from the source node to the destination node based on a change in the dynamic state of the plurality of nodes constituting the logical network using the received routing registration message (S110). The nodes constituting a logical network are shared by other logical networks, and in a logical network that transmits large-capacity data, the state of a data process capacity or a data transmission capability of each node is dynamically changed depending on the function of shared logical networks. Thus, the nodes in the logical network are not recognized as being positioned on a routing path employing a one-dimensional graph structure, but the nodes having various data process times and data transmission times are recognized as a routing path employing a multi-dimensional graph structure based on a change in the dynamic state of the nodes. Multiple routing paths from the source node to the destination node are created based on a change in the dynamic state of nodes using the routing path employing a multi-dimensional graph structure.

Routing costs for the created multiple routing paths are calculated based on optimum data process time, optimum data transmission time, and estimated state transition information, which are included in the routing registration message, and a process time transition value and a transmission time transition value, which are shared by the plurality of nodes (S120). Then, a routing table is created which has stored therein the calculated routing costs for the multiple routing paths (S130).

As used herein, the terms "optimum data process time" refers to the time required for data to be inputted and outputted in a state in which there is no load in a node, the terms "optimum data transmission time" refers to the time required for data to be transmitted between nodes in a state in which there is no load between nodes, and the terms "estimated state transition information" refers to the state range in which the node is changed to a state transition until the present time. Meanwhile, as used herein, the term "process time transition value" refers to a threshold value in which the node's state is transited to the next state due to an increase in the data process time of the node, and the term "transmission time transition value" refers to a threshold value in which the node's state is transited to the next state due to an increase in the data transmission time of the node.

A routing path with the lowest routing cost among the multiple routing paths from the source node to the destination node of the logical network is determined as a data routing path based on the routing costs for the multiple routing paths stored in the routing table (S140).

Figure 3:
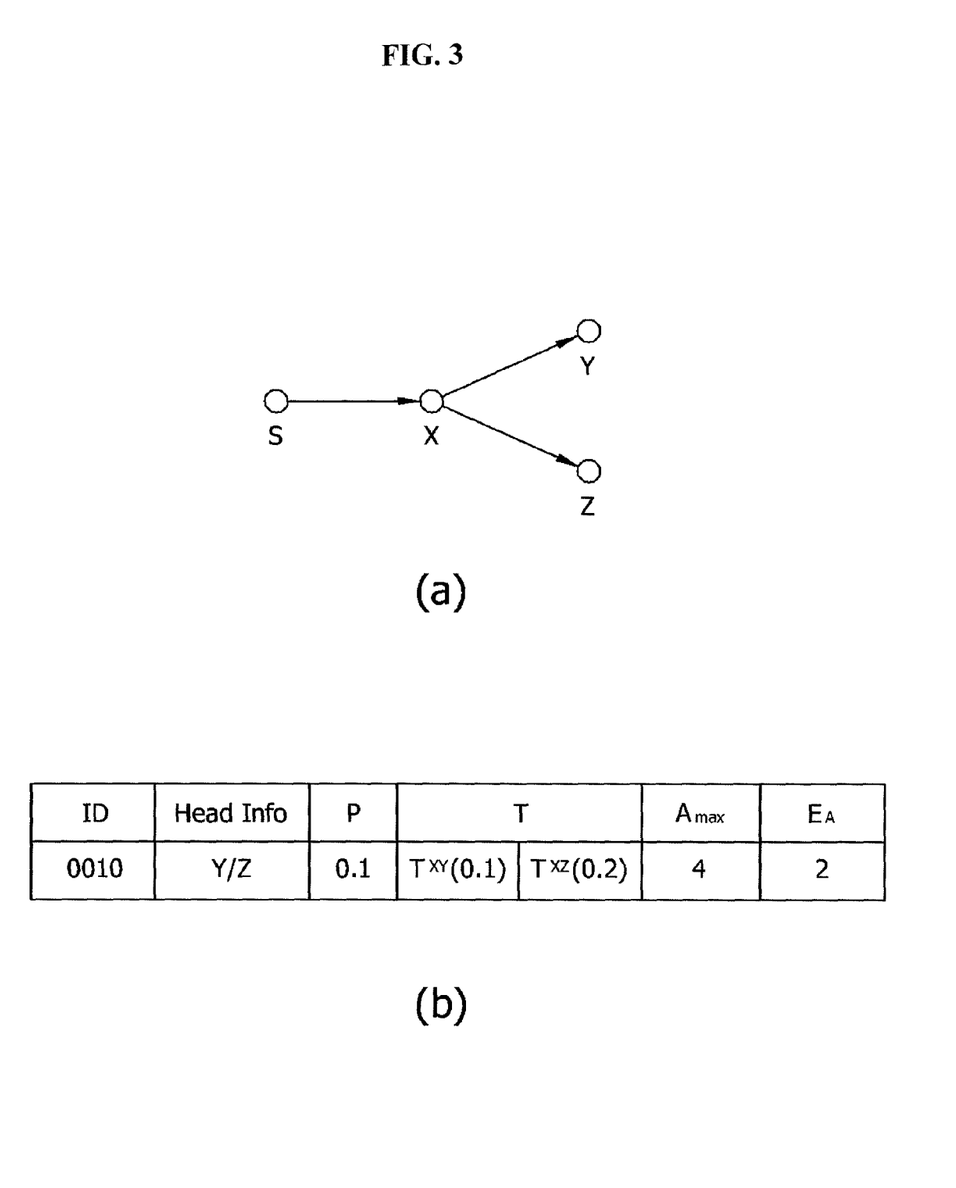
FIG. 3 illustrates an example of a routing registration message according to the present invention.

FIG. 3 illustrates an example of a routing registration message according to the present invention.

An example of a routing registration message created in a node X of a network having the connection as shown in FIG. 3(a) will be described hereinafter with reference to FIG. 3(b).

The routing registration message includes an identifier (ID) of the node X, connection information (Head Info) of nodes to which the node X is connected in a direction in which data is transmitted, optimum data process time (P) of the node X, optimum data transmission time (T) from the node X to directionality connection nodes (Y, Z), maximum state transition information ($A_{max}$) representing the maximum range in which the node X can be changed by the state transition, and estimated state transition information ($E_A$) of the node X.

Figure 4:
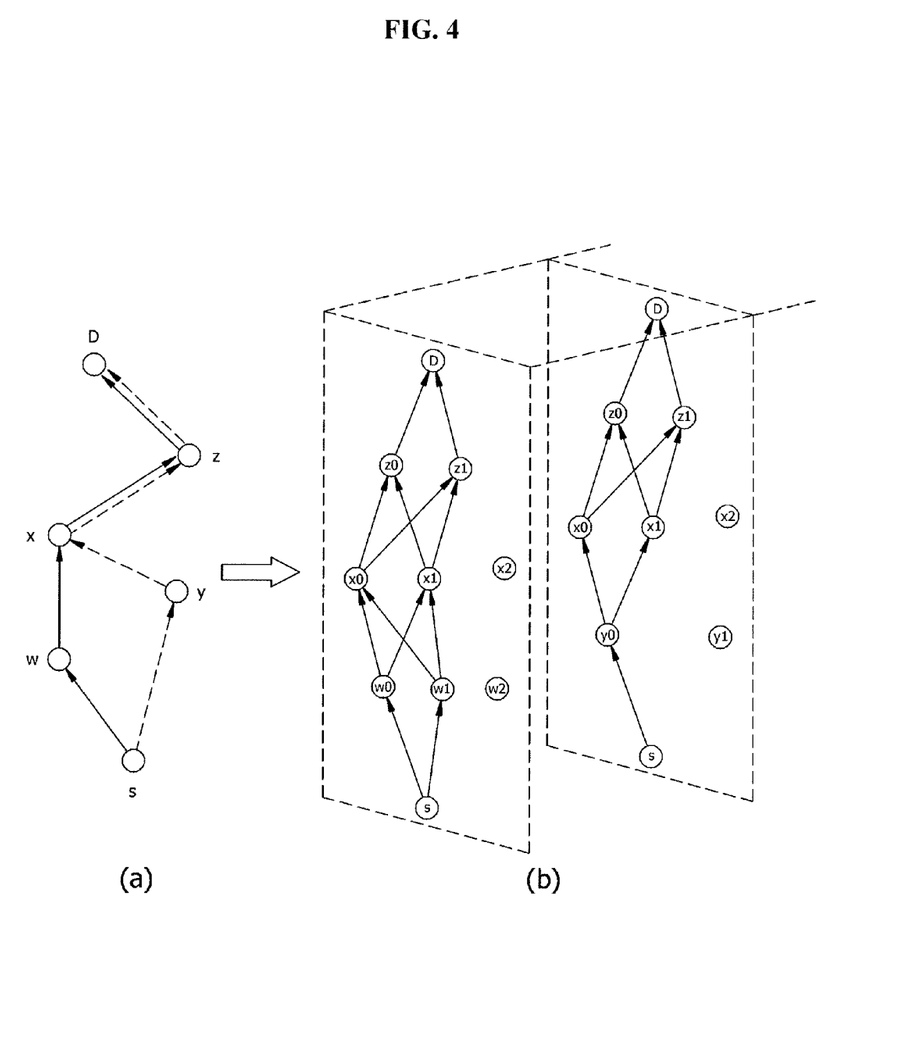
FIG. 4 illustrates an example of multiple routing paths created in a routing path determining method according to the present invention.

FIG. 4 illustrates an example of multiple routing paths created in a routing path determining method according to the present invention.

FIG. 4(a) is an example of a single routing path from a source node (S) to a destination node (D) in a logical network when viewed from the point of view of a one-dimensional graph structure. As shown in FIG. 4(a), a routing path 1 from the source node (S) to the destination node (D) is S→W→X→Z→D, and a routing path 2 from the source node (S) to the destination node (D) is S→Y→X→Z→D.

FIG. 4(b) is an example multiple routing paths from a source node (S) to a destination node (D) in a logical network viewed from the point of view of a multi-dimensional graph structure. In a routing path 1 considering the state change of each node positioned in the routing path 1 from the source node (S) to the destination node (D), the state of data process time or data transmission time of an intermediate node (W) is dynamically changed depending on the function of a plurality of shared logical networks, and the intermediate node (W) has the state transition of w0, w1, and w2 depending on the dynamic change of the state.

Meanwhile, the intermediate node (X) in the routing path 1 has the state transition of w0, w1, and w2 depending on the dynamic change of the state thereof in the plurality of shared logical networks. In addition, an intermediate node (Z) has the state transition of z0 and z1 depending on the dynamic change of the state thereof in the plurality of shared logical networks.

An example in which an intermediate node (X) is state-transited will be described hereinafter in detail.

The intermediate node (X) is transited to the next state (x1) if the optimum data process time exceeds a process time transition value or the optimum data transmission time exceeds a transmission time transition value depending on the function in the plurality of logical networks in a first transition state (X0) originally having the optimum data process time and the optimum data transmission time. For example, if the actual data process time of the intermediate node (X) is two times larger than the optimum data process time, i.e., exceeds the process time transition value depending on the function in the plurality of logical networks, or the actual data transmission time is two times larger than the optimum data transmission time, i.e., exceeds the transmission time transition value, the intermediate node X) is transited to the next state (x1).

A source node (S) creates the routing path 1 from the source node (S) to the destination node (D) using the connection state information of routing registration messages received from the intermediate nodes (W, X, Z) positioned on the routing path 1 and the estimated state transition information. The source node (S) can create the multiple routing paths only in the case where the intermediate nodes are in a state of having been actually transited until the present time based on the estimated state transition information instead of creating the multiple routing paths based on the maximum state transition information, thereby reducing the time spent to create the multiple routing paths and the calculation amount, and the calculation amount and time spent to calculate the routing costs for the multiple routing paths later or retrieve the routing costs from the routing table in the corresponding states of the intermediate nodes.

Meanwhile, in another embodiment of the present invention the source node (S) may previously create the multiple routing paths for all the cases where the intermediate nodes can be state-transited based on the maximum state transition information instead of creating the routing path 1 from the source node (S) to the destination node (D) based on the connection state information and the estimated state transition information of routing registration messages received from the intermediate nodes (W, X, Z) positioned on the routing path 1.

Multi-routing paths for a routing path 2 from the source node (S) to the destination node (D) are created in the same manner as in the above case, and the detailed description thereof will be omitted for brevity for the sake of explanation.

Figure 5:
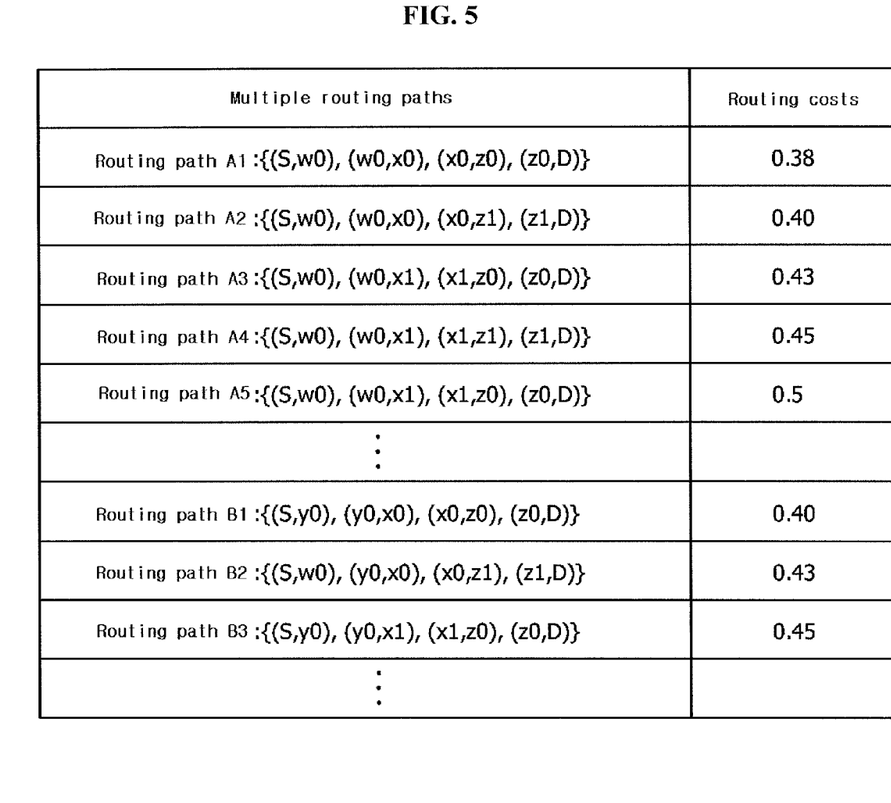
FIG. 5 illustrates an example of a routing table created in a routing path determining method according to the present invention.

FIG. 5 illustrates an example of a routing table created in a routing path determining method according to the present invention;

More specifically, referring to FIG. 5, the source node calculates the routing costs for the multiple routing paths created in consideration of the state transition depending on a change in the dynamic state of the intermediate nodes, based on the process time transition value and the transmission time transition value, which are shared by all the nodes in the logical network, and the optimum data process time, the optimum data transmission time, and the estimated state transition information, which are included in the routing registration message, and stores the calculated respective routing costs for the multiple routing paths in the routing table.

An example of a process for calculating the routing costs in the routing path determining method according to the present invention will be described hereinafter.

An intermediate node of a routing path transmits the optimum data process time, the optimum data transmission time, and the estimated state transition information to the source node through an initial routing registration message. For example, as the data process time of the intermediate node (X) is changed in the order of 0.2, 0.4 and 0.8 if the process time transition value is 2 and the optimum data process time is 0.1, the intermediate node (X) has state transitions ($X_0, X_1, X_2$). The source node and the intermediate node (X) share the process time transition value with each other, and thus the source node can calculate the cost for the data process time at respective state transitions ($X_0, X_1, X_2$) of the intermediate node (X) only based on the optimum data process time and the estimated state transition information of the routing registration message received from the intermediate node (X).

The routing path determining method according to the present invention enables the routing costs for all the multiple routing paths to be easily calculated only based on the optimum data process time, the optimum data transmission time, and the estimated state transition information, which are included in the routing registration message since all the nodes shares the process time transition value and the transmission time transition value.

Figure 6:
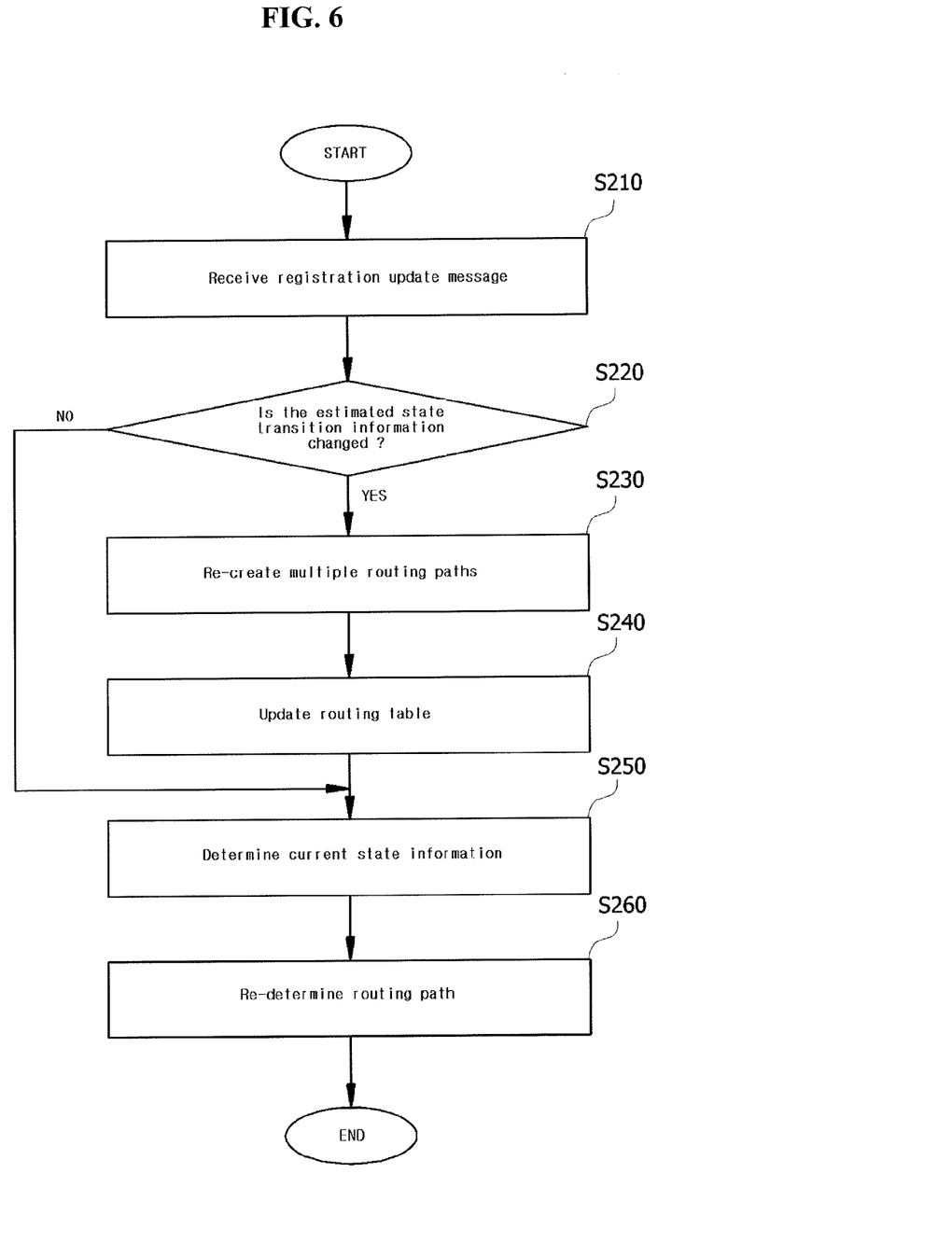
FIG. 6 is a flowchart for more specifically explaining a step of re-creating multiple routing paths according to the present invention.
Figure 7:
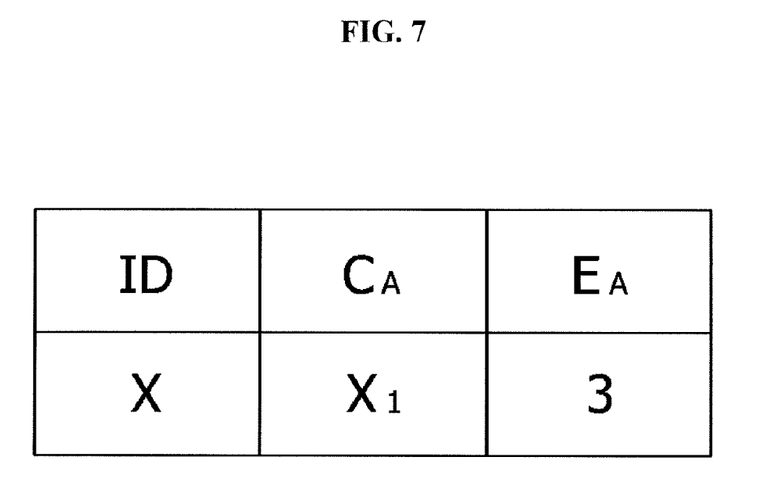
FIG. 7 illustrates an example of a registration update message according to the present invention.

FIG. 6 is a flowchart for more specifically explaining a step of re-creating multiple routing paths according to the present invention, and FIG. 7 illustrates an example of a registration update message according to the present invention.

More specifically referring to FIG. 6, the source node periodically receives a registration update message from intermediate nodes positioned on a routing path (S210). As shown in FIG. 7, the registration update message includes a node identifier (ID), information ($C_A$) on a current transition state of the node, and estimated state transition change information ($E_A$) representing an estimated state transition range changed when existing estimated state transition information of the node is changed.

The source node (S) determines whether an existing estimated state transition range of the intermediate nodes is changed or not based on the estimated state transition change information of the registration update message received from the intermediate nodes (S220).

If it is determined at S220 that the estimated state transition range of the intermediate nodes is changed, the source node (S) re-create multiple routing paths from the source node to the destination node based on a change in the dynamic state of the changed estimated state transition range (S230), and updates the routing table based on the routing costs obtained by calculating the routing costs for the re-created multiple routing paths (S240). Preferably, if the estimated state transition range is increased, only the multiple routing paths increased in response to an increased change in the dynamic state and the routing costs for the increased multiple routing paths are additionally updated in the routing table.

The source node determines the information on a current transition state of the registration update message received from the intermediate nodes positioned on the routing path (S250), and retrieves the routing costs for the routing paths corresponding to the current transition state of the intermediate nodes determined among the multiple routing paths from the routing table and determines a routing path with the lowest routing cost as a data routing path (S260).

In the meantime, the above-described embodiments of the present invention can be implemented in a general purpose digital computer that Meanwhile, the embodiments of the present invention as described above can be constructed by a computer program that can be executed in a computer and can be implemented in a general-purpose digital computer that operates the program using a computer-readable recording medium.

The computer-readable recording medium includes recording media such as magnetic storage media (e.g., ROMs, floppy disks, hard disks, and the like), optical recording media (e.g., CD-ROMs, DVDs, and the like) and carrier waves (e.g., transmission through the Internet).

The routing path determining method according to the present invention as constructed above has the following diverse advantageous effects as compared to the conventional routing path determining method.

First, the routing path determining method according to the present invention enables a routing path to be determined with a minimum cost in a communication network in which a plurality of logical networks shares nodes by defining a routing path employing a one-dimensional graph structure based on the concept of a multi-dimensional graph structure considering a change in the dynamic state of nodes.

Second, the routing path determining method according to the present invention enables multiple routing paths to be created depending on the dynamic change of the data process time and data transmission time of nodes shared by a plurality of logical networks, so that a routing path with a minimum cost can be easily determined based on the routing costs for the created multiple routing paths.

Third, the routing path determining method according to the present invention enables the routing costs for multiple routing paths to be easily calculated with a small amount of data based on a routing registration message, and a process time transition value and a transmission time transition value shared by nodes, so that a routing path with a minimum cost can be rapidly determined.

Fourth, the routing path determining method according to the present invention enables multiple routing paths to be created only based on a change in transition state of nodes, which is actually used depending on the empirical use state of nodes until the present time, so that unnecessary creation of the multiple routing paths can be prevented.

Fifth, the routing path determining method according to the present invention considers both a process time transition value and a transmission time transition value shared by nodes in a plurality of logical networks that processes large-capacity data, thereby providing a routing path determining method specialized in a virtualized network.

While the present invention has been described in connection with the exemplary embodiments illustrated in the drawings, it is merely illustrative and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should be defined by the technical spirit of the appended claims.

What is claimed is:

1. A method for determining a routing path in a communication network of a plurality of nodes, the method comprising:
receiving, by a source node, a routing registration message from the remaining nodes other than the source node among the plurality of nodes;
creating, by the source node, multiple routing paths from the source node to a destination node based on a change in a dynamic state of the remaining nodes using the received routing registration message;
calculating, by the source node, routing costs for the created multiple routing paths based on the received routing registration message, and a process time transition value and a transmission time transition value shared by the remaining nodes;

creating, by the source node, a routing table having stored therein the calculated routing costs for the multiple routing paths; and determining, by the source node, a routing path with the lowest routing cost among the multiple routing paths as a data routing path based on the calculated routing costs, wherein the routing registration message includes node connection state information, optimum data process time, optimum data transmission time, maximum state transition information, and estimated state transition information until the present time, wherein the source node periodically receives a registration update message including current state information and estimated state transition change information, which are measured in the remaining nodes, from the remaining nodes, wherein the source node determines a routing path with the lowest routing cost among the multiple routing paths as a data routing path based on the current state information of the registration update message and the routing costs for the multiple routing paths stored in the routing table.

2. The method according to claim 1, wherein the communication network supports a plurality of logical networks, and the plurality of logical networks selectively shares the plurality of nodes constituting the communication network.

3. The method according to claim 2, wherein said creating the multiple routing paths comprises:

determining a single routing path from the source node to the destination node based on the node connection state information of the routing registration message; and creating multiple routing paths from the source node to the destination node based on a change in the dynamic state of an estimated state transition range of a node constituting the single routing path using the estimated state transition information of the nodes constituting the single routing path.

4. The method according to claim 3, wherein the source node re-creates the multiple routing paths from the source node to the destination node based on a change in the dynamic state of the estimated state transition range, which is changed when the estimated state transition information of the node is changed, using the estimated state transition change information of the registration update message.

5. The method according to claim 2, wherein said creating the multiple routing paths comprises:

determining a single routing path from the source node to the destination node based on the node connection state information of the routing registration message; and creating multiple routing paths from the source node to the destination node based on a change in the dynamic state of a maximum state transition range of a node constituting the single routing path using the maximum state transition information of the nodes constituting the single routing path.

* * * * *